United States Patent [19]

VanHoose

[11] Patent Number: 5,419,602

[45] Date of Patent: May 30, 1995

[54] APPARATUS FOR PROTECTING VEHICLE CARGO AREA

[76] Inventor: Jeffery J. VanHoose, 2517 Sweetbriar, Edmond, Okla. 73034

[21] Appl. No.: 58,476

[22] Filed: May 5, 1993

[51] Int. Cl.⁶ .............................................. B62D 33/02
[52] U.S. Cl. ................................ 296/39.1; 296/37.16
[58] Field of Search .................... 296/39.1, 39.2, 37.16

[56] References Cited

U.S. PATENT DOCUMENTS

| | | | |
|---|---|---|---|
| Re. 33,200 | 4/1990 | Reynolds et al. | 296/39.1 |
| 2,898,146 | 8/1959 | Yudenfreurd | 296/39 |
| 2,911,253 | 11/1959 | Dewey | 296/39 |
| 3,653,710 | 4/1972 | Barnard | 296/39 |
| 4,943,105 | 7/1990 | Kacar et al. | 296/24.2 |
| 4,979,772 | 12/1990 | Carey et al. | 296/39.1 |
| 5,083,831 | 1/1992 | Foyen | 296/39.1 |
| 5,167,433 | 12/1992 | Ryan | 296/37.1 |

FOREIGN PATENT DOCUMENTS 2257666  1/1993  United Kingdom ............... 296/39.2

Primary Examiner—Joseph Pape
Attorney, Agent, or Firm—Robert Treece

[57] ABSTRACT

A liner for use in the rear cargo area of a vehicle wherein the cargo area has a floor, at least a partial front formed by a seat, left and right sides and a rear formed by at least one door. The liner has a shape sustaining bottom, a front wall and side walls. A removable rear wall may also be used with the invention.

18 Claims, 4 Drawing Sheets

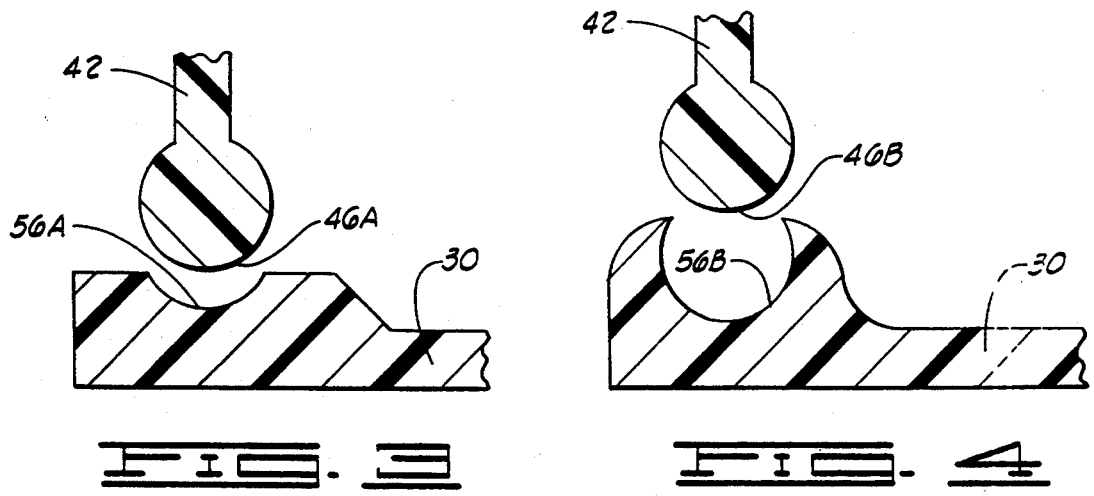
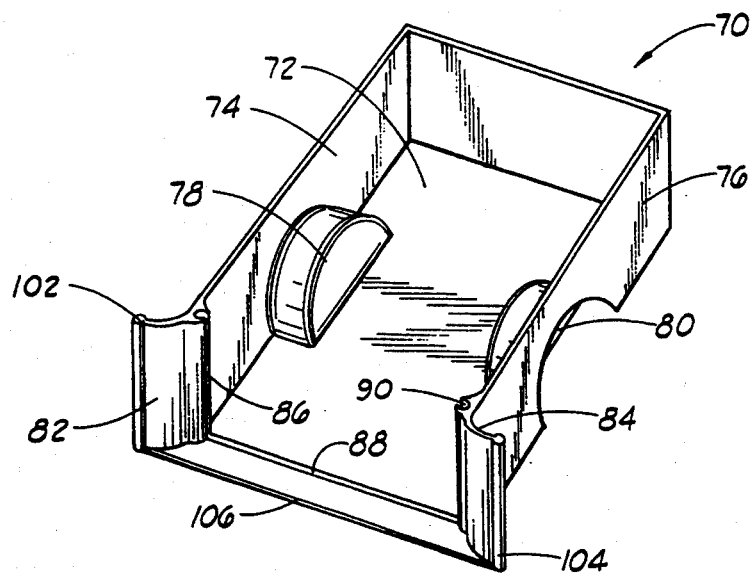
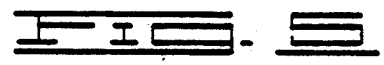
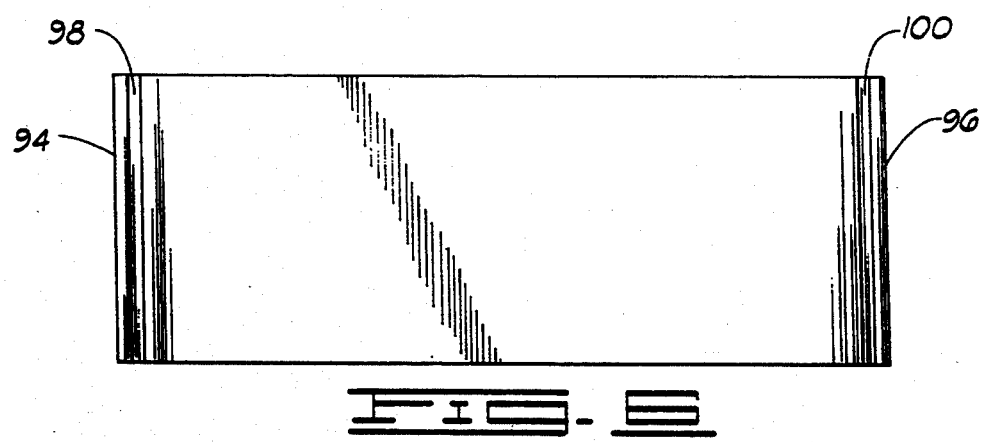
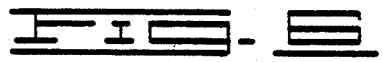

APPARATUS FOR PROTECTING VEHICLE CARGO AREA

FIELD OF THE INVENTION

The present invention relates to an apparatus for protecting the cargo area of vehicles.

SUMMARY OF THE INVENTION

Sport utility vehicles such as Suburbans, Grand Wagoners, Cherokees, Broncos, Blazers, Troopers, Explorers and other similar vehicles have become quite popular as all purpose vehicles. These vehicles offer the comfort and amenities of a passenger car and the cargo capacity of a small truck. However, before the presence of my invention the interior of these vehicles was often damaged if they were used to haul certain cargo such as bricks, stones, firewood, fertilizer, paint, trash, construction debris, live animals, dead game animals or other similar items. In addition, it was virtually impossible to use these vehicles to haul fine loose materials such as dirt, sand and the like without destroying the carpet found in the cargo area. Similarly, if liquids such as water or gas were split from their container while in the cargo area the clean up was difficult and time consuming.

In the present invention, a liner protects the cargo area from such damage and provides a surface which is easy to clean. The liner may be either a single piece preformed shape sustaining liner or it may be a multiple piece liner.

One object of the present invention is to provide an apparatus which protects the interior cargo area of a vehicle.

A second object of the present invention is to provide a liner which may easily be removed from the cargo area of a vehicle and stored.

A third object of the present invention is to provide a liner having a removable end to allow cargo to be shoveled, thrown, placed in, or removed from, the liner with ease.

A fourth object of the present invention is to provide a liner which disassembles into two or more parts for ease of storage.

Other objects, features and advantages of the present invention will become apparent from the following detailed description when read in conjunction with the accompanying drawings and appended claims.

BRIEF DESCRIPTION OF THE DRAWINGS

FIG. 3 is an enlarged cross-sectional view of a connecting point utilized with the present invention.

FIG. 4 is an enlarged cross-sectional view of another type of connecting point utilized with the present invention.

FIG. 5 is a perspective view of another form of liner constructed in accordance with the present invention.

FIG. 6 is an elevational view of a removable rear panel for the present invention.

DETAILED DESCRIPTION OF THE PREFERRED EMBODIMENTS

Figure 1:
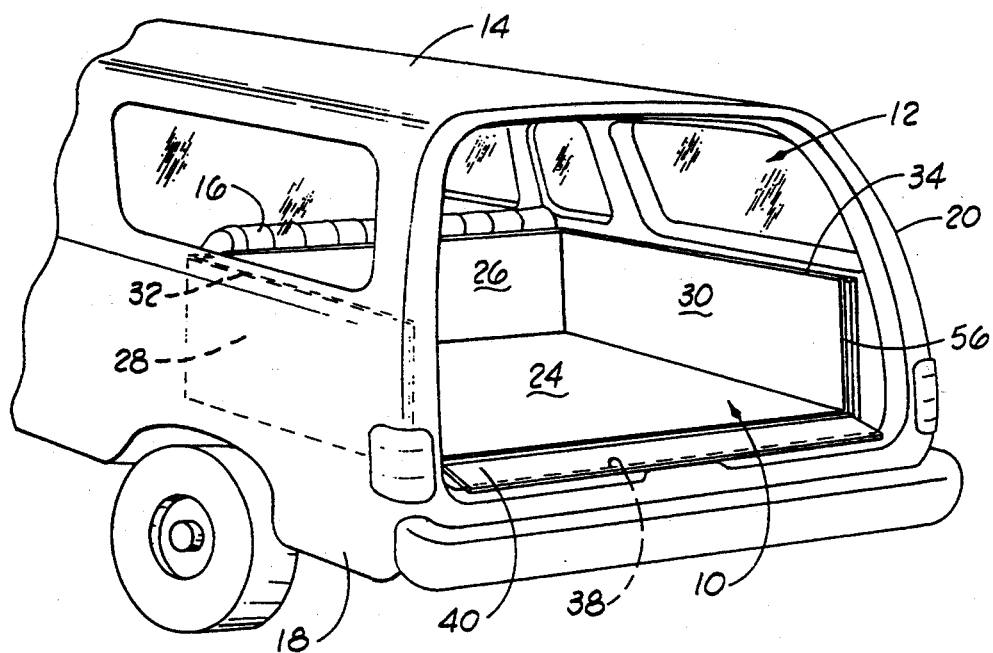
FIG. 1 is a perspective view of a vehicle utilizing an apparatus constructed in accordance with the present invention.

Referring to the drawings in detail and to FIG. 1 in particular, reference character 10 generally designates a vehicle liner constructed in accordance with the present invention and reference character 12 designates a cargo area of a vehicle 14 in which the liner 10 may be used. It should be noted that the representative cargo area 12 is defined by a seat back 16, the left and right sides of the vehicle 18 and 20 respectively and a vehicle rear door (not shown).

In FIG. 1, the rear seat 16 of the vehicle 14 is in place for receiving passengers. However, it should be understood that the liner 10 may be sized to occupy the cargo area 12 of the vehicle 14 if the rear seat was folded down or removed. For example, in Suburbans there are three rows of seats, the front seats and two rows of passenger seats. The rear row of passenger seats are removable thereby creating a cargo area approximately the size of the bed of a pickup. The liner 10 of this invention is especially useful in such a case, since the large cargo area of the Suburban is often not fully utilized for fear of damage.

For the sake of clarity the front of the liner will be considered to be the side nearest the front of the vehicle when the liner is in the cargo area of the vehicle. Similarly the left and right sides correspond with the left and right sides of the vehicle when one is facing the same direction as the front of the vehicle.

The liner 10 has a bottom 24 which is generally rectangular in shape and sized to generally fit the floor cargo area 12 of a vehicle 14. In this embodiment, a front wall 26 and side walls, 28 and 30, are integral with the bottom 24. The front wall 26 and side walls, 28 and 30 extend upwardly from the bottom 24. Preferably the upper edges 32 and 34 of the side walls 28 and 30 are further apart than their lower edges where the side walls 28 and 30 join the bottom 24. In this way, the molding process is simplified and several liners may be stacked so that one liner fits inside another for shipping.

In this embodiment, the bottom 24, front 26 and sides, 28 and 30, of the liner 10 are preferably molded as a single piece. The thickness of the liner 10 should be sufficient so the liner will maintain its general shape and will resist puncture from materials such as rocks or bricks. Preferably the liner thickness is from about 1/32" to about $\frac{1}{2}$" thick, and more preferably the thickness of the liner is from about $\frac{1}{8}$" to $\frac{1}{4}$", and most preferably the liner is about 3/16" thick.

The liner 10 is preferably made from a synthetic or natural material that may be shaped when soft and then hardened such as resins, resinoid, polymers, cellulose derivatives, casen materials, and proteins. More preferably the liner is molded from a thermoplastic or rubberized thermoplastic.

In the vehicles to be utilized with this invention, the rear door(s) of the vehicle seal to a facing around a rear opening, such as facing 38. Preferably the rear end 40 of the bottom 24 of the liner 10 extends beyond the cargo area 12 of the vehicle 14 onto facing 38. In this way, loose materials placed in the liner 10 cannot fall from the rear of the liner 10 onto the floor of the cargo area. When the liner 10 is made with a rear end 40 which extends beyond the cargo area 12, the thickness of the rear end 40 may be reduced relative to the rest of the liner 10. For example, if the liner 10 was 3/16" thick the rear end 40 of the liner may only be 1/32" thick. In this way the rear end 40 could be pliable to form fit the facing 38 of the vehicle 14. The bottom 24 may also have holes, such as hole 58, formed therein to receive screws for securing the liner 10 into the cargo area 12. Preferably the holes 58 are in the rear end 40 and are spaced to align with screws used to hold moldings to the rear facing 38 of the vehicle 14.

The sides of the liner 10 may also extend onto the facing 38 in a similar manner. However, it has been found that extending the sides, 28 and 30, does not offer as much protection as extending the bottom 24, and may interfere with removing the liner from the cargo area.

Figure 2:
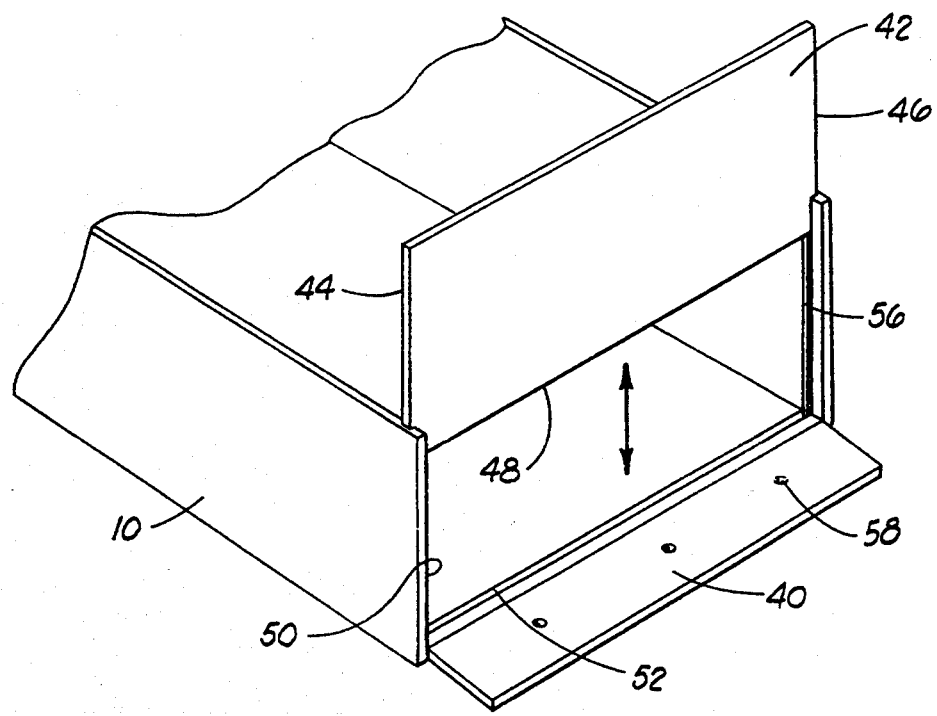
FIG. 2 is a perspective view of the apparatus of FIG. 1.

As shown in FIG. 2, a removable rear liner wall 42 may be included to protect the rear door(s) of the vehicle 14 and to hold materials in the liner 10 when the rear door(s) are opened. Preferably the left edge 44, the right edge 46 and the bottom edge 48 of the rear liner wall 42 are sized to fit in recesses 50, 52, and 56 in the liner 10.

FIGS. 3 and 4 show an enlarged cross sectional views of two preferred embodiments of the edge 46 and the matching recess 56. With the embodiment shown in FIG. 3 the edge 46A fits into recess 56A. With this embodiment the liner 10 should be sized such that the left and right side walls are biased against vehicle walls 28 and 30. In this way the edges 44 and 46 will remain seated into the recesses 50 and 56.

The recess 52 is preferably similar to recess 56A shown in FIG. 3. By making a shallow recess, materials such as sand which may fall into the recess 52 are easy to remove so the rear liner panel 42 may seat in the recess.

Another preferred embodiment of the present invention is shown in FIG. 5 and is designated by character 70. In this embodiment the liner 70 has a bottom 72 which is generally formed to fit the floor of the cargo area. In this way, the liner 70 utilizes more space in those vehicles having irregularly shaped cargo areas.

Similarly liner sides 74 and 76 are also shaped to generally conform with the left and right sides of the cargo area respectively. FIG. 5 is representative and not intended to illustrate the only way the liner may be shaped to generally conform with a particular vehicle. However, the liner 70 in FIG. 5 shows some common shapes which may be incorporated in to a liner which is formed to generally fit the cargo area of a vehicle. By way of example, wheel wells 78 and 80 may be formed in the bottom 72 and sides 74 and 76 to conform to corresponding wheel wells in the cargo area. Some of the other shapes which liner 70 may include are flares, recesses, and cutouts. For Example, the sides 74 and 76, may have flared rear ends such as ends 82 and 84 to correspond to similar shapes in the cargo area.

A liner formed to generally fit the cargo area may also have a removable rear liner panel such as panel 42 (shown in FIG. 2). As discussed above the panel may fit into recesses, such as recesses 86, 88 and 90, in sides, 74 and 76, and bottom 72 of the liner 70 in a similar manner as that shown in FIGS. 2-4.

Figure 7:
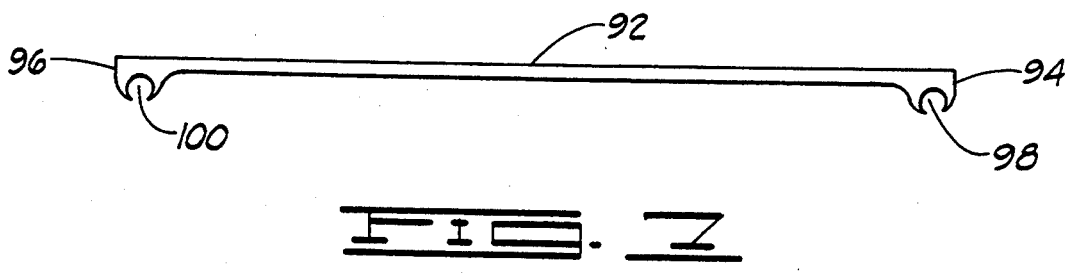
FIG. 7 is a top plan view of the removable rear panel of FIG. 6.

FIGS. 5-7 illustrate another way for removably securing a rear panel to the liners of this invention. Rear panel 92 may have ends 94 and 96 with recesses such as 98 and 100 formed therein. Corresponding appendages 102 and 104 on the rear ends of the sides 74 and 76 are sized to fit within the recesses 98 and 100. Thus, when the rear panel is slid or snapped into place on the liner 70 it is held in place. A recess 106 in the rear of the bottom 72 may be provided to hold the lower edge of the panel 92 in place.

Figure 8:
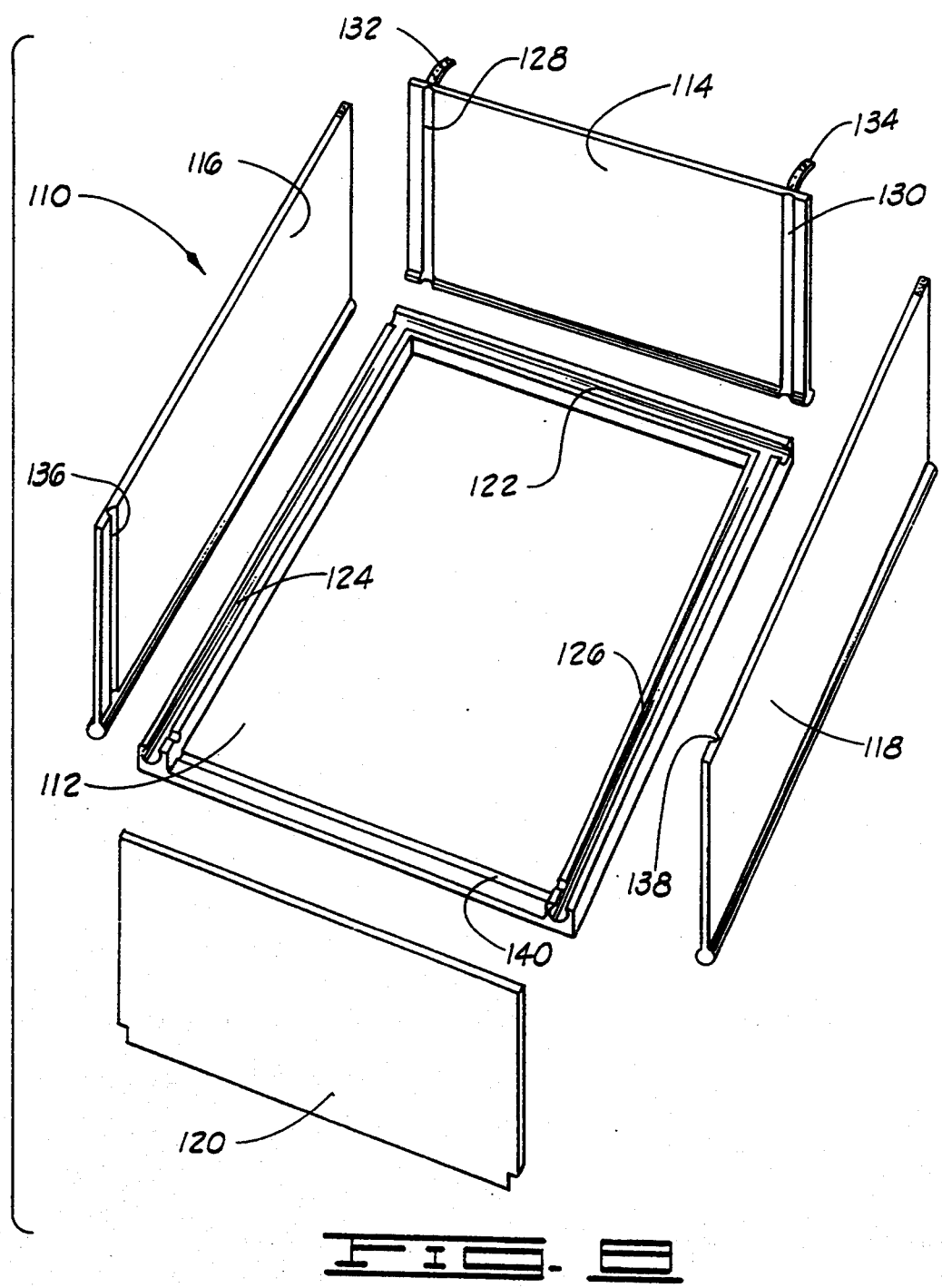
FIG. 8 is an exploded perspective view of another form of liner constructed in accordance with the present invention.

Another preferred embodiment of the liner is shown in FIG. 8 and is generally designated by the character 110. The liner 110 includes a bottom 112, a removable front 114 and removable left and right sides 116 and 118. The liner 110 may also include a removable rear panel 120. Since the liner may be assembled or disassembled it is easy to remove and store when not in use.

The bottom 112 includes receiving channels 122, 124 and 126. The channels are shaped to receive the lower ends of the front 114, and sides 116 and 118 respectively. Since the liner is preferably formed from a shape sustaining resilient material, such as plastic, the front and sides may be snapped or slid into the channels for assembly. Since the edges of the bottom are thickened to form the channels, the bottom will prevent liquids or fine solids from running off the front or sides of the liner.

The front 114 may include recesses 128 and 130 to receive and hold the front edges of panels 116 and 118. If the liner is sized to snugly fit the cargo area, front 114 will be biased against sides 116 and 118 to hold the sides in the recesses 128 and 130. Holding means such as clips, straps, bolts, pins or others, may be used to hold the sides 116 and 118 in the recesses 128 and 130. By way of example, and not limitation, VELCRO straps 132 and 134 may be secured to the front for attachment to the sides 116 and 118.

Similarly, rear panel 120 may slide or snap into rear groves 136, 138 and 140 thereby holding the rear panel 120 in place. In this way the rear panel may be easily removed so one may throw or shovel material into the liner 110.

Figure 9:
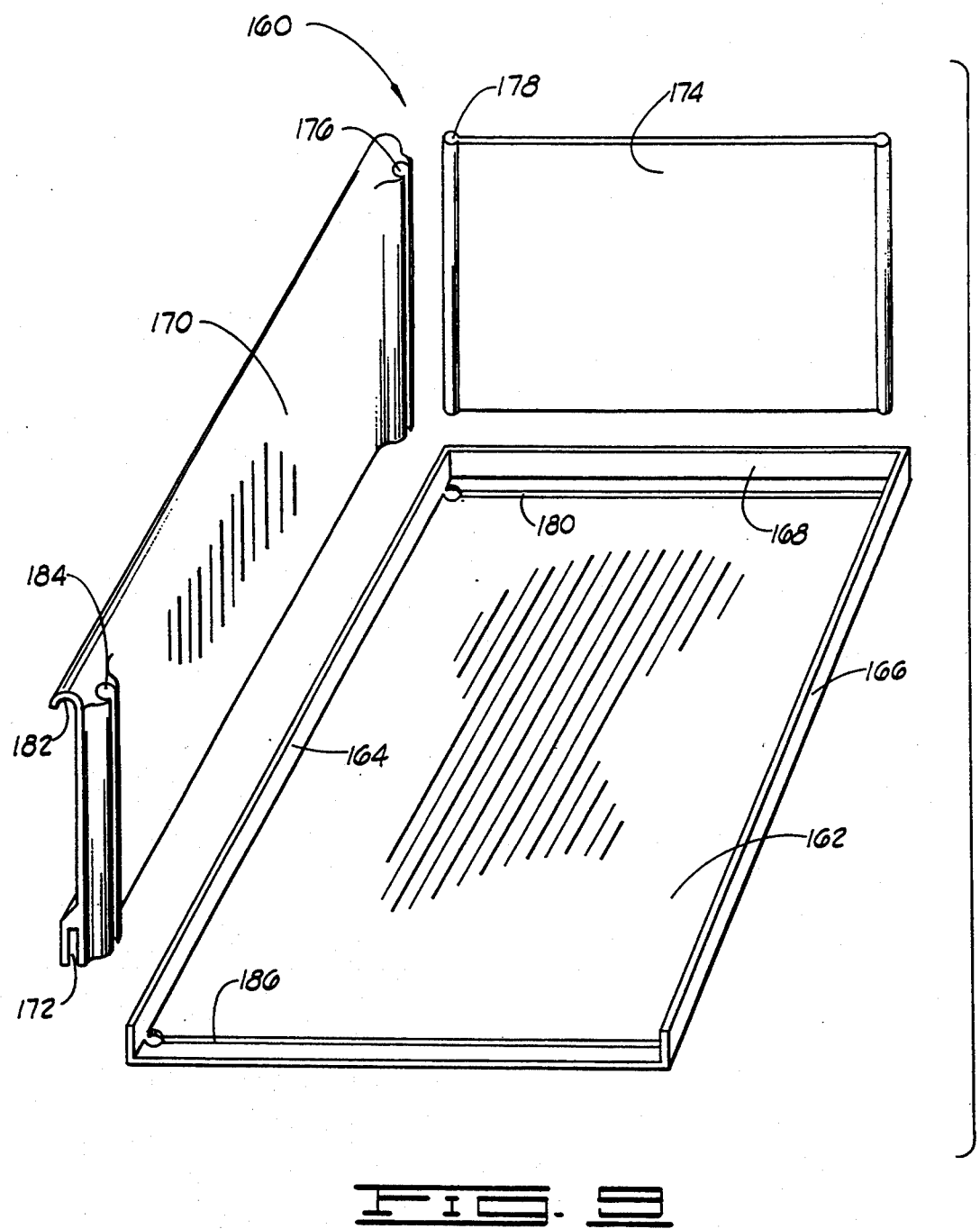
FIG. 9 is an exploded perspective view of another form of liner constructed in accordance with the present invention.

FIG. 9 shows another embodiment of the liner of this invention, the liner being designated by the character 160. The liner 160 includes a bottom 162 having protruded edges 164, 166 and 168. The bottom may be generally rectangular or may be shaped to generally conform with the floor of the cargo area. Since the bottom is shaped like a three sided pan, liquids or the like are prevented from running off the sides or front of the liner bottom 162.

Sides, such as side 170, are also provided for extending the liner up from the bottom to protect the sides of the cargo area and to allow one to carry more material in the liner. The side 170 may include a recess 172 along the lower edge thereof to accept the protrusion 164. In this way the protrusion 164 can hold the side 170 in place.

A front panel 174 is also provided is secured to the sides by a holding means, such as interlocking channel 176 and protrusion 178. A groove 180 may also be provided in the bottom 162 to further hold the front 174.

A rear panel similar in construction to front panel 174 may also be provided. If provided, the rear panel (not shown) may be secured to the sides in the same way as the front panel is secured to the sides. That is, an interlocking channel (such as channel 184) may be provided near or on the rear edge of the sides. A groove 186 may also be provided near the rear edge of the bottom 162 to further hold the rear panel.

To provide rigidity, edge roles such as role 182 may be provided on the sides, front and/or rear. In addition, grooving, ridges or texture may be formed into the bottom, sides, front or rear to provide greater rigidity.

Changes may be made in the combinations, operations and arrangements of the various parts and elements described herein without departing from the spirit and scope of the invention as defined in the following claims.

I claim:

1. A liner for use in the rear cargo area of a vehicle, the cargo area having a floor, at least a partial front formed by a seat, left and right sides, and a rear formed by at least one door, wherein the liner comprises:

a shape sustaining bottom conforming generally to the shape of the floor, wherein the bottom has a front edge, a left edge, a right edge and a rear edge;

a shape sustaining front liner wall integral with the front edge of the bottom and extending upwardly therefrom;

a shape sustaining right liner wall generally conforming with the right side of the cargo area, the right liner wall being integral with the right edge of the bottom and the front liner wall, and wherein the right liner wall extends generally upward from the bottom;

a shape sustaining left liner wall generally conforming with the left side of the cargo area, the left liner wall being integral with the left edge of the bottom and the front liner wall, and wherein the left liner wall extends generally upward from the bottom; and wherein the vehicle door which forms the rear of the cargo area seals to a facing around a rear opening in the vehicle and the rear edge of the bottom of the liner extends beyond the cargo area floor onto the facing.

2. The liner of claim 1 wherein the left and right liner walls extend beyond the cargo area onto the facing.

3. The liner of claim 2 wherein the bottom of the liner includes holes for securing the liner to the vehicle.

4. The liner of claim 1 further comprising a shape sustaining rear liner wall removably connected to the bottom, left liner wall and right liner wall.

5. The liner of claim 4 wherein the bottom, left liner wall and, right liner wall include recesses for receiving and holding the rear liner wall.

6. A liner for use in the rear cargo area of a vehicle, the cargo area having a floor, at least a partial front formed by a seat, left and right sides, and a rear formed by at least one door, wherein the liner comprises:

a shape sustaining bottom conforming generally to the shape of the floor, wherein the bottom has a front edge, a left edge, a right edge and a rear edge;

a shape sustaining front liner wall integral with the front edge of the bottom and extending upwardly therefrom;

a shape sustaining right liner wall generally conforming with the right side of the cargo area, the right liner wall being integral with the right edge of the bottom and the front liner wall, and wherein the right liner wall extends generally upward from the bottom; and a shape sustaining left liner wall generally conforming with the left side of the cargo area, the left liner wall being integral with the left edge of the bottom and the front liner wall, and wherein the left liner wall extends generally upward from the bottom; and a shape sustaining rear liner wall removably connected to the bottom, left liner wall and right liner wall, wherein the rear liner wall has top, bottom and opposing side edges.

7. The liner of claim 6 wherein the left liner wall and, right liner wall include recesses for receiving and holding the rear liner wall, and wherein the bottom includes a notch for receiving and holding the rear liner wall.

8. The liner of claim 6 wherein the bottom, front, right, left and rear are made from plastic.

9. A liner for use in the rear cargo area of a vehicle, the cargo area having a floor, at least a partial front formed by a seat, left and right sides, and a rear formed by at least one door, wherein the liner comprises:

a generally rectangular shape sustaining bottom, wherein the bottom has a front edge, a left edge, a right edge and a rear edge;

a shape sustaining front liner wall removably connected to the front edge of the bottom and extending upwardly therefrom;

a shape sustaining right liner wall removably connected to the right edge of the bottom and removably connected to the front liner wall, and wherein the right liner wall extends generally upward from the bottom; and a shape sustaining left liner wall removably connected to the left edge of the bottom and removably connected to the front liner wall, and wherein the left liner wall extends generally upward from the bottom, wherein the front, right and left edges of the bottom include an upwardly extending projection and wherein the corresponding liner walls include a channel for connecting the walls to the bottom.

10. A liner for use in the rear cargo area of a vehicle, the cargo area having a floor, at least a partial front formed by a seat, left and right sides, and a rear formed by at least one door, wherein the liner comprises:

a generally rectangular shape sustaining bottom, wherein the bottom has a front edge, a left edge, a right edge and a rear edge;

a shape sustaining front liner wall removably connected to the front edge of the bottom and extending upwardly therefrom;

a shape sustaining right liner wall removably connected to the right edge of the bottom and removably connected to the front liner wall, and wherein the right liner wall extends generally upward from the bottom; and a shape sustaining left liner wall removably connected to the left edge of the bottom and removably connected to the front liner wall, and wherein the left liner wall extends generally upward from the bottom, wherein the front, right and left edges of the bottom include a channel shaped to receive the corresponding walls for matingly connecting the walls to the bottom.

11. The liner of claim 9 wherein the vehicle door which forms the rear of the cargo area seals to a facing around a rear opening in the vehicle and the rear edge of the bottom of the liner extends beyond the cargo area floor onto the facing.

12. The liner of claim 11 wherein the left and right liner walls extend beyond the cargo area onto the facing.

13. The liner of claim 12 wherein the bottom of the liner includes holes for securing the liner to the vehicle.

14. The liner of claim 9 further comprising a shape sustaining rear liner wall removably connected to the bottom, left liner wall and right liner wall.

15. The liner of claim 14 wherein the bottom, front, right, left and rear are made from plastic.

16. The liner of claim 6 wherein the bottom has a thickness and wherein the thickness is between about 1/32 of an inch to about ½ of an inch.

17. The line of claim 6 wherein the bottom has a thickness and wherein the thickness is between about ⅛ of an inch to about ¼ of an inch.

18. The liner of claim 6 wherein the bottom has a thickness and wherein the thickness is about 3/16 of an inch.

* * * * *